US008506174B2

(12) United States Patent
Nakagawa (10) Patent No.: US 8,506,174 B2
(45) Date of Patent: Aug. 13, 2013

(54) OPTICAL CONNECTOR

(75) Inventor: Masaya Nakagawa, Kyoto (JP)

(73) Assignee: Suncall Corporation, Kyoto (JP)

( * ) Notice: Subject to any disclaimer, the term of this patent is extended or adjusted under 35 U.S.C. 154(b) by 154 days.

(21) Appl. No.: 13/150,567

(22) Filed: Jun. 1, 2011

(65) Prior Publication Data

US 2012/0002925 A1    Jan. 5, 2012

(30) Foreign Application Priority Data

Jun. 30, 2010    (JP) .................................. 2010-149777

(51) Int. Cl.
  *G02B 6/36*    (2006.01)
(52) U.S. Cl.
  USPC ............................................. 385/78; 385/55
(58) Field of Classification Search
  USPC ....................................... 385/78, 55
  See application file for complete search history.

(56) References Cited

U.S. PATENT DOCUMENTS

| 5,243,673 | A | * | 9/1993 | Johnson et al. | 385/90 |
| 5,579,425 | A | * | 11/1996 | Lampert et al. | 385/59 |
| 6,017,153 | A | * | 1/2000 | Carlisle et al. | 385/56 |
| 6,024,498 | A | * | 2/2000 | Carlisle et al. | 385/56 |
| 6,196,733 | B1 | * | 3/2001 | Wild | 385/86 |
| D523,396 | S | * | 6/2006 | Shiraishi et al. | D13/133 |
| 7,527,515 | B1 | * | 5/2009 | Olson et al. | 439/352 |
| 2011/0097044 | A1 | * | 4/2011 | Saito et al. | 385/83 |
| 2011/0212643 | A1 | * | 9/2011 | Reed et al. | 439/345 |

FOREIGN PATENT DOCUMENTS

| EP | 2 296 023 | 3/2011 |
| JP | 9-127370 | 5/1997 |
| JP | 11-316323 | 11/1999 |
| JP | 2006-047810 | 2/2006 |
| JP | 2009-109978 | 5/2009 |
| JP | 2009-229545 | 10/2009 |

OTHER PUBLICATIONS

Japanese Office Action issued Apr. 19, 2012 in corresponding Japanese Patent Application No. 2010-149777 with partial translation.

* cited by examiner

*Primary Examiner* — Charlie Peng
*Assistant Examiner* — Peter Radkowski
(74) *Attorney, Agent, or Firm* — Wenderoth, Lind & Ponack, L.L.P.

(57) ABSTRACT

An optical connector includes a second operation lever extending rearward from a first operation lever. By pressing a rear end portion of the second operation lever up, or pressing the second operation lever forward, the first operation lever can be inclined forward. In this way, a front end portion of the first operation lever presses a rear end portion of a locking lever down, and disengages the locking lever and an optical adapter from each other. Thus, the optical connector can be detached from the optical adapter.

4 Claims, 8 Drawing Sheets

OPTICAL CONNECTOR

TECHNICAL FIELD

The present invention relates to an optical connector.

BACKGROUND ART

An optical connector is used to connect an optical fiber to another optical fiber or an optical communication module so as to allow optical communication therebetween. For example, an optical connector provided at a leading end of an optical fiber cable is mounted to an optical adapter (or optical receptacle, hereinafter, the same applies), to thereby connect the optical fiber cable and another optical fiber cable or an optical communication module to each other so as to allow optical communication therebetween.

Figure 14:
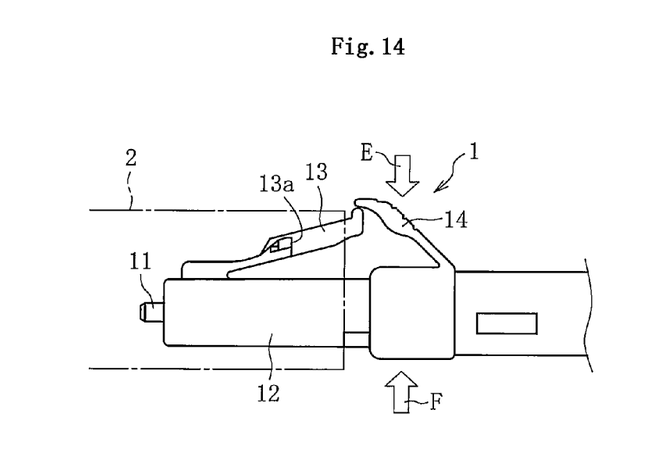
[FIG. 14] A side view of a conventional optical connector.

As one kind of optical connector, there is known the optical connector including the locking lever for preventing the optical connector from coming off the optical adapter (for example, Patent Literature 1). For example, as illustrated in FIG. 14, an optical connector 1 of this kind includes a ferrule 11, a housing 12 holding the ferrule 11 therein, and a locking lever 13 extending rearward and obliquely upward from a top surface of the housing 12. When the optical connector 1 is mounted to an optical adapter 2 (indicated by a chain line of FIG. 14), an interlocking portion 13a of the locking lever 13 and the optical adapter 2 are engaged with each other, to thereby prevent the optical connector 1 from coming off the optical adapter 2. In this state, when pressing the locking lever 13 from above, the interlocking portion 13a of the locking lever 13 and the optical adapter 2 are disengaged from each other, and thus it is possible to detach the optical connector 1 from the optical adapter 2.

However, under a state in which the optical connector 1 is mounted to the optical adapter 2, most of the locking lever 13 is housed in the optical adapter 2, and hence it is difficult to press the locking lever 13 from above when detaching the optical connector 1. Accordingly, as illustrated in FIG. 14, an operation lever 14 extending forward and obliquely upward is sometimes provided rearward of the locking lever 13. By pressing the operation lever 14 from above, a front end portion of the operation lever 14 presses a rear end portion of the locking lever 13 down, and thus the interlocking portion 13a of the locking lever 13 and the optical adapter 2 can be disengaged from each other.

CITATION LIST

Patent Literature

[PTL 1] JP 2009-109978 A
[PTL 2] JP 2009-229545 A

SUMMARY OF INVENTION

Technical Problem

When detaching the above-mentioned optical connector 1 from the optical adapter, the operation lever 14 needs to be pressed from above (see an arrow E of FIG. 14), and hence a space is required above the optical connector 1. Further, when pressing the operation lever 14, the optical connector 1 needs to be supported from below (see an arrow F of FIG. 14), and hence a space is required also below the optical connector 1. In other words, in order to detach the optical connector 1 from the optical adapter 2, sufficient spaces are required above and below the optical connector 1.

Figure 15:
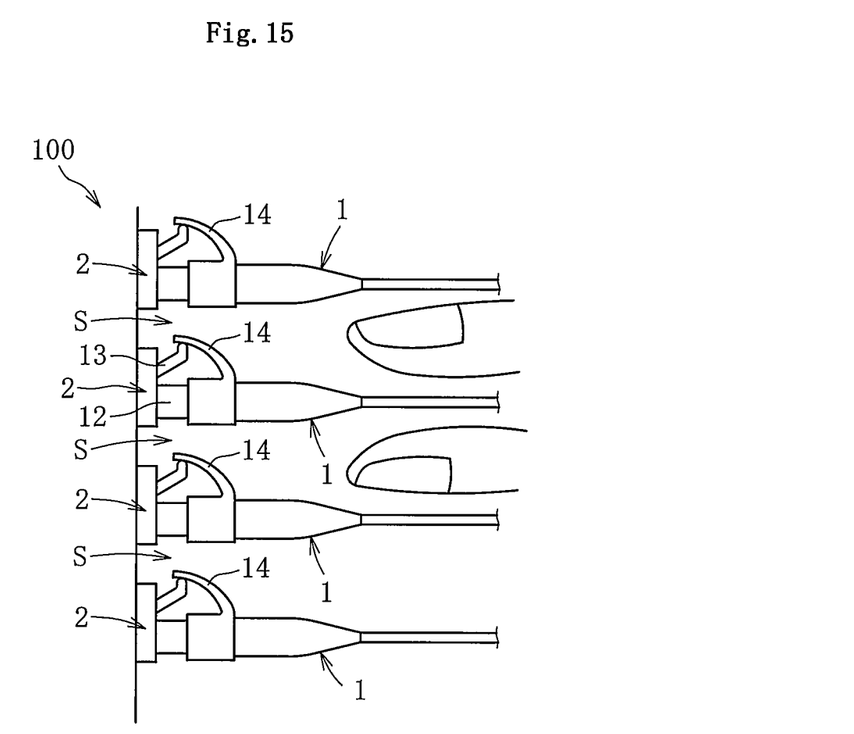
[FIG. 15] A side view of the conventional optical connectors attached to the optical server appliance.

For example, as illustrated in FIG. 15, on a back surface of a large-size optical server appliance 100, a large number of optical adapters 2 (optical connection terminals) are provided highly densely. Under a state in which the optical connectors 1 are mounted to the optical adapters 2, spaces S above and below the optical connector 1 are extremely small. It is extremely difficult to insert fingers (or jig, etc.) into such extremely small spaces S so as to press the operation lever 14 from above and support the housing 12 from below, and hence detaching work for the optical connector 1 is troublesome.

For example, Patent Literature 2 discloses the optical connector including the slider provided rearward of the operation lever (release lever). According to the optical connector, by sliding the slider rearward, the operation lever and the tapered surface provided in the slider are engaged with each other, and thus the operation lever can be pressed down. However, the slider described above is slidable with respect to the housing, and has complex structure having the tapered surface for pressing the operation lever down, resulting in an increase in manufacturing cost.

An object to be achieved by the present invention is to provide, at low cost, an optical connector which can be easily detached from an optical adapter even in a highly dense arrangement.

Solution to Problem

In order to achieve the above-mentioned object, the present invention provides an optical connector, including: a ferrule fixed to a leading end of an optical fiber; a holding member for holding the ferrule and the optical fiber within its inner periphery; a locking lever including an interlocking portion to be engaged with an optical adapter, and having a front end portion connected onto one side surface of the holding member, and a rear end portion away from the one side surface; a first operation lever provided rearward of the locking lever, and having a rear end portion connected onto the one side surface of the holding member, and a front end portion away from the one side surface; and a second operation lever extending rearward from the first operation lever, the rear end portion of the locking lever being arranged between the front end portion of the first operation lever and the one side surface of the holding member.

As described above, the optical connector according to the present invention includes the second operation lever extending rearward from the first operation lever, and hence by pressing a rear end portion of the second operation lever up (in other words, by moving the rear end portion of the second operation lever away from the one side surface of the holding member), or by pressing the second operation lever forward, the first operation lever can be inclined forward. In this way, the front end portion of the first operation lever presses the rear end portion of the locking lever down (in other words, brings the rear end portion of the locking lever close to the one side surface of the holding member), and disengages the locking lever and the optical adapter from each other, thereby being capable of detaching the optical connector from the optical adapter. In this case, it is unnecessary to press the first operation lever from above, and hence an upper space for pressing the first operation lever and a lower space for supporting the optical connector from below when pressing the first operation lever are not required. Therefore, even in a case where there is little space above and below the optical connector, it is possible to easily detach the optical connector from the optical adapter. Further, it is only necessary to provide the second operation lever extending rearward from the first operation lever, and hence, unlike the above-mentioned slider of Patent Literature 2, a separate member does not need to be provided, with the result that manufacturing cost can be reduced. Note that, in an extending direction of the optical fiber, the leading end side of the optical fiber is referred to as a "front side", and the opposite side thereof is referred to as a "rear side" (see FIG. 1, hereinafter, the same applies).

When pressing the second operation lever up or forward, if the second operation lever is elastically deformed largely, a deformation amount of the first operation lever is small, and hence there is a fear in that the locking lever cannot be pressed down sufficiently. Accordingly, it is preferred that the first operation lever be deformed more easily than the second operation lever. For example, when a bottom portion of the first operation lever (region of the first operation lever between the rear end portion and a portion connected to the second operation lever) is made smaller in thickness than the second operation lever, the first operation lever is lower in rigidity than the second operation lever, and hence it is possible to deform the first operation lever more easily than the second operation lever. Note that, the thickness described herein refers to a thickness in a direction orthogonal to the extending direction of the first operation lever or the second operation lever.

Alternatively, when the second operation lever is connected to the front portion of the first operation lever to the extent possible, a distance from a fulcrum (rear end portion) of the first operation lever to a power point (portion connected to the second operation lever) is large, and hence it is possible to easily deform the first operation lever. For example, the second operation lever can be connected to the leading end side with respect to an extending-direction center portion of the first operation lever.

Further, when the extending-direction length of the second operation lever is increased, a distance from a fulcrum (front end portion) of the second operation lever to a power point (rear end portion) is large, and hence it is possible to reduce a force required for operation of the second operation lever. For example, the rear end portion of the second operation lever can be extended rearward of the rear end portion of the first operation lever.

When pressing the second operation lever up or forward at the time of detaching the optical connector, moment load is applied to a connecting portion between the first operation lever and the second operation lever, and hence it is necessary to increase strength of the connecting portion therebetween. For example, it is preferred that the first operation lever and the second operation lever be integrally molded.

ADVANTAGEOUS EFFECTS OF INVENTION

As described above, according to the present invention, it is possible to obtain, at low cost, the optical connector which can be easily detached from an optical adapter even in a highly dense arrangement.

DESCRIPTION OF EMBODIMENTS

Hereinafter, embodiments of the present invention are described with reference to the drawings.

Figure 1:
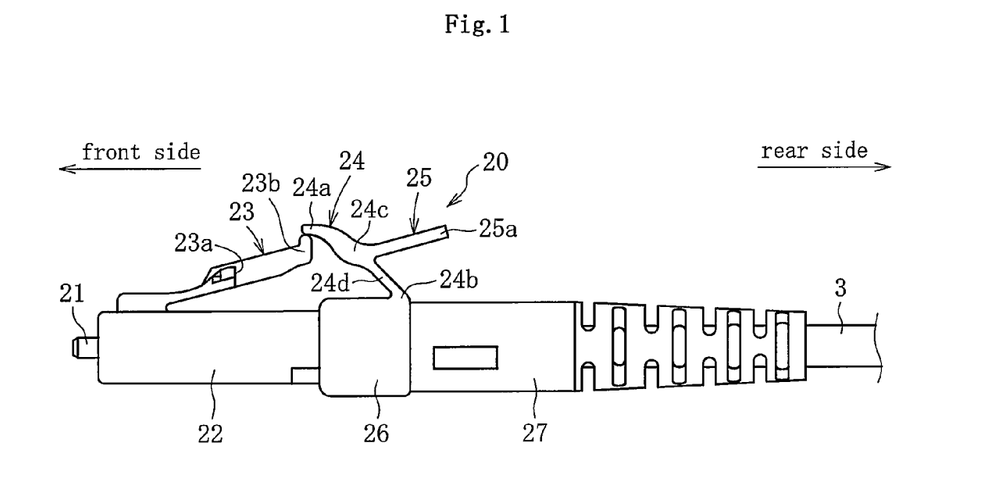
[FIG. 1] A side view of an optical connector according to an embodiment of the present invention.

FIG. 1 illustrates an optical connector 20 according to an embodiment of the present invention. The optical connector 20 is an LC-type optical connector, and is fixed to a leading end of an optical fiber cable 3 incorporating an optical fiber therein. The optical connector 20 mainly includes a ferrule 21 fixed to the leading end of the optical fiber (not shown), a housing 22 as a holding member for holding the ferrule 21 therein, a locking lever 23 provided on a top surface of the housing 22, a first operation lever 24 provided rearward of the locking lever 23, a second operation lever 25 extending rearward from the first operation lever 24, and a boot 27 provided rearward of the housing 22. Note that, in the following description, an extending direction of the optical fiber (right-left direction of FIG. 1) is referred to as an "optical axis direction", a leading end side of the optical fiber in the optical axis direction (left side of FIG. 1) is referred to as a "front side", and the opposite side thereof (right side of FIG. 1) is referred to as a "rear side". Further, of directions orthogonal to the optical axis direction, the up-down direction of FIG. 1 is referred to as an "up-down direction", and a direction orthogonal to both the optical axis direction and the up-down direction, that is, a direction orthogonal to the drawing sheet of FIG. 1 is referred to as a "width direction".

The ferrule 21 has a through-hole (not shown) formed therein and passing therethrough in the optical axis direction, and the optical fiber provided inside the optical fiber cable 3 is inserted through the through-hole. The optical connector 20 is mounted to an optical adapter, and the leading end portion of the ferrule 21 is caused to abut against a leading end portion of a ferrule of an optical connector as a counterpart. As a result, the optical fiber is connected to be able to establish optical communication to the optical fiber as the counterpart.

The housing 22 is made of, for example, a resin, and formed into a substantially rectangular parallelepiped to have a shape adapted for a mounting hole of the optical adapter. The ferrule 21 is held inside the housing 22. The leading end portion of the ferrule 21 protrudes forward from the housing 22. A spring (not shown) is provided inside the housing 22, and the spring holds the ferrule 21 in a forward biased state.

A front end portion of the locking lever 23 is connected onto the top surface of the housing 22, whereas a rear end portion thereof is away from the top surface of the housing 22. With this structure, a rear end portion 23b of the locking lever 23 can be elastically moved up and down. In this embodiment, the locking lever 23 extends rearward and obliquely upward from the top surface of the housing 22. Further, in this embodiment, the locking lever 23 and the housing 22 are integrally molded of a resin. The locking lever 23 includes an interlocking portion 23a in its middle portion. The interlocking portion 23a is engaged with an interlocking portion (not shown) provided to the optical adapter in the optical axis direction, to thereby prevent the optical connector 20 from coming off the optical adapter. When elastically pressing the rear end portion 23b of the locking lever 23 down, the interlocking portion 23a and the optical adapter can be disengaged from each other.

A rear end portion 24b of the first operation lever 24 is connected onto the top surface of the housing 22, whereas a front end portion 24a thereof is away from the top surface of the housing 22. With this structure, the front end portion 24a of the first operation lever can be elastically moved up and down. In this embodiment, the rear end portion 24b of the first operation lever 24 is connected to the housing 22 through a fixing portion 26, and the first operation lever 24 extends forward and obliquely upward from the top surface of the fixing portion 26. The fixing portion 26 is formed into a tubular shape, and is fitted onto the outer peripheral surface of the housing 22. The rear end portion 23b of the locking lever 23 is arranged between the front end portion 24a of the first operation lever 24 and the top surface of the housing 22. In other words, the front end portion 24a of the first operation lever 24 is arranged above the rear end portion 23b of the locking lever 23.

Figure 2:
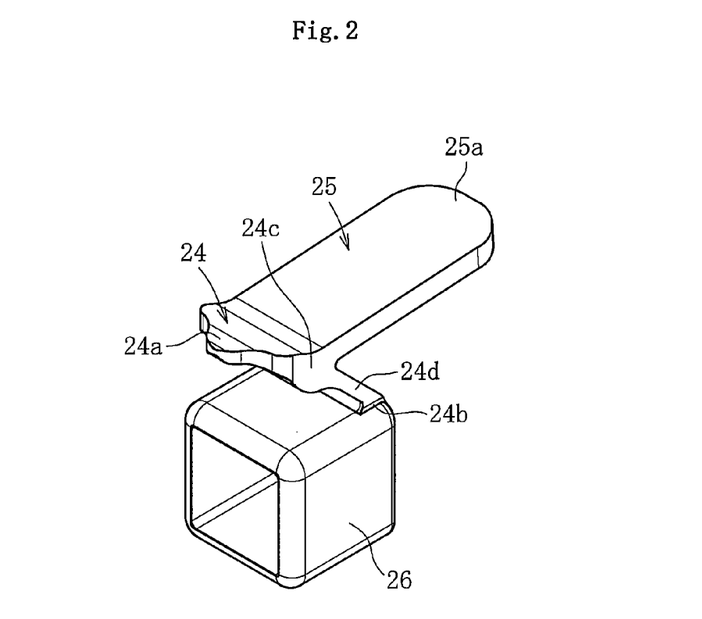
[FIG. 2] A perspective view of an operation lever unit of the optical connector.

The second operation lever 25 extends rearward from the first operation lever 24. A rear end portion 25a of the second operation lever 25 can be elastically moved up and down relative to the first operation lever 24. The rear end portion 25a of the second operation lever 25 is arranged rearward of the rear end portion 24b of the first operation lever 24. In this embodiment, the second operation lever 25 is formed into a flat-plate-like shape, and is slightly inclined rearward and obliquely upward. It is preferred that the second operation lever 25 be provided so as not to extend above the upper end portion of the first operation lever 24. This is to ensure as large a space as possible around the optical connector 20 even in a case where the optical connector 20 is arranged highly densely. Further, in this embodiment, as illustrated in FIG. 2, the first operation lever 24, the second operation lever 25, and the fixing portion 26 are integrally molded as an operation lever unit.

Figure 3:
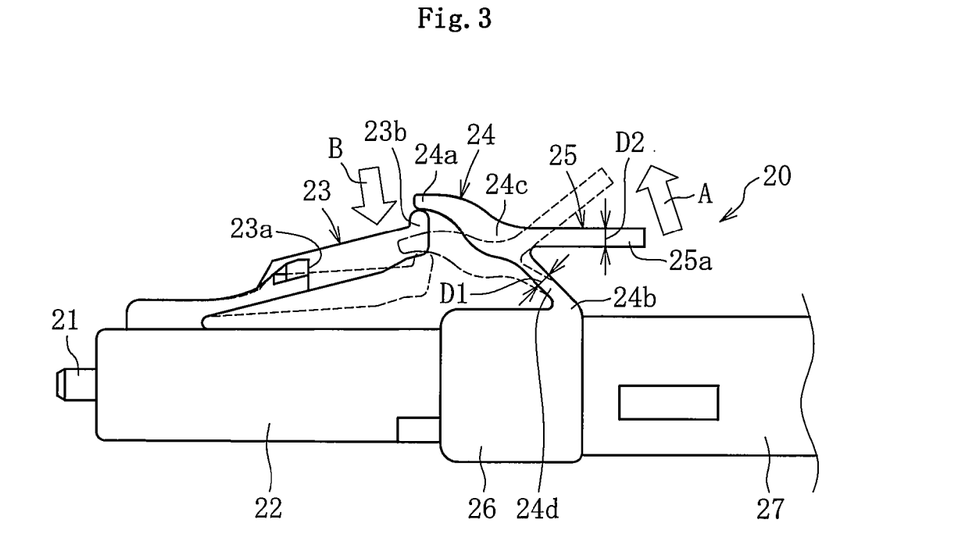
[FIG. 3] A side view illustrating a deformation state when the optical connector is detached from an optical adapter.

As illustrated in FIG. 3, when pressing the rear end portion 25a of the second operation lever 25 upward (see an arrow A), moment load is applied to a connecting portion 24c between the second operation lever 25 and the first operation lever 24, and the first operation lever 24 is inclined forward with the rear end portion 24b as a fulcrum (indicated by the dotted line of FIG. 3). Specifically, a bottom portion 24d between the connecting portion 24c and the rear end portion 24b of the first operation lever 24 is elastically deformed, and thus the first operation lever 24 is inclined forward. In this way, the front end portion 24a of the first operation lever 24 presses the rear end portion 23b of the locking lever 23 down (see an arrow B), and thus the interlocking portion 23a of the locking lever 23 and the optical adapter are disengaged from each other.

The shape of the first operation lever 24 and the shape of the second operation lever 25 are designed so that the bottom portion 24d of the first operation lever 24 is deformed most largely when pressing the second operation lever 25 up, in other words, the design is made so that stress to be applied to the bottom portion 24d of the first operation lever 24 becomes maximum. For example, the design is made so that rigidity of the second operation lever 25 is higher than rigidity of the bottom portion 24d of the first operation lever 24. In the illustrated example, a thickness D1 of the bottom portion 24d of the first operation lever 24 is smaller than a thickness D2 of the second operation lever 25 (D1<D2).

Further, when an extending-direction length of the bottom portion 24d of the first operation lever 24 is large, a distance from a power point (connecting portion 24c) to a fulcrum (rear end portion 24b) is large, and hence a force required to deform the bottom portion 24d is reduced. In this embodiment, the connecting portion 24c is provided on the leading end side with respect to an extending-direction center portion of the first operation lever 24.

Further, when an extending-direction length of the second operation lever 25 is large, a distance from a power point (rear end portion 25a) to a fulcrum (connecting portion 24c) is large, and hence a force required to incline the first operation lever 24 is reduced. In this embodiment, the rear end portion 25a of the second operation lever 25 extends rearward of the rear end portion 24b of the first operation lever 24.

By the way, when reducing the extending-direction length of the bottom portion 24d of the first operation lever 24, or reducing the extending-direction length of the second operation lever 25, a force required for operation becomes larger, but on the contrary, the front end portion 24a of the first operation lever can be pressed down largely with less operation amount. Therefore, the extending-direction length of the bottom portion 24d of the first operation lever 24 and the extending-direction length of the second operation lever 25 may be designed in light of balance between a level of a force required to press down the locking lever 23 and an operation amount of the second operation lever 25.

As described above, by pressing the second operation lever 25 of the optical connector 20 up, the first operation lever 24 presses the locking lever 23 down, to thereby be able to disengage the interlocking portion 23a of the locking lever 23 and the optical adapter from each other. Therefore, as illustrated in, for example, FIG. 4, even in a case where the optical connectors 20 are mounted to optical adapters 2 arranged on a back surface of an optical server appliance 100 highly densely, and spaces S above and below the optical connector 20 are extremely small, the optical connectors 20 can be easily detached from the optical adapters 2. Specifically, as in the illustrated example, a finger (or jig, etc.) is inserted between the second operation lever 25 and the boot 27 to press the second operation lever 25 up, to thereby detach the optical connector 20 from the optical adapter 2.

Figure 4:
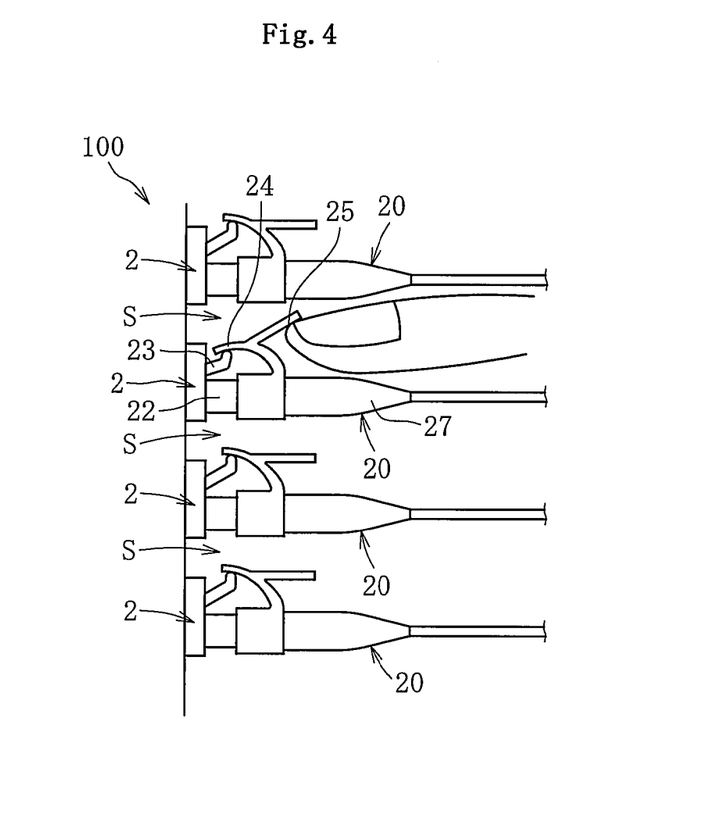
[FIG. 4] A side view of the optical connectors attached to an optical server appliance.

At this time, another optical connector (not shown) is provided inside the optical server appliance 100, and a ferrule of the another optical connector and the ferrule 21 of the above-mentioned optical connector 20 are caused to abut against and be connected to each other, to thereby allow optical communication therebetween. At this time, the ferrules 21 are caused to abut against each other in a state of being biased to the leading end side by an elastic force of the spring. In this state, the second operation lever 25 is pressed up, and the interlocking portion 23a of the locking lever 23 and the optical adapter 2 are disengaged from each other, with the result that the optical connector 20 is biased rearward by a reaction force of the spring. Accordingly, it is possible to more easily detach the optical connector 20.

The present invention is not limited to the above-mentioned embodiment. Hereinafter, other embodiments of the present invention are described. Portions having the same functions as those of the above-mentioned embodiment are denoted by the same reference symbols, and redundant description is omitted.

Figure 5:
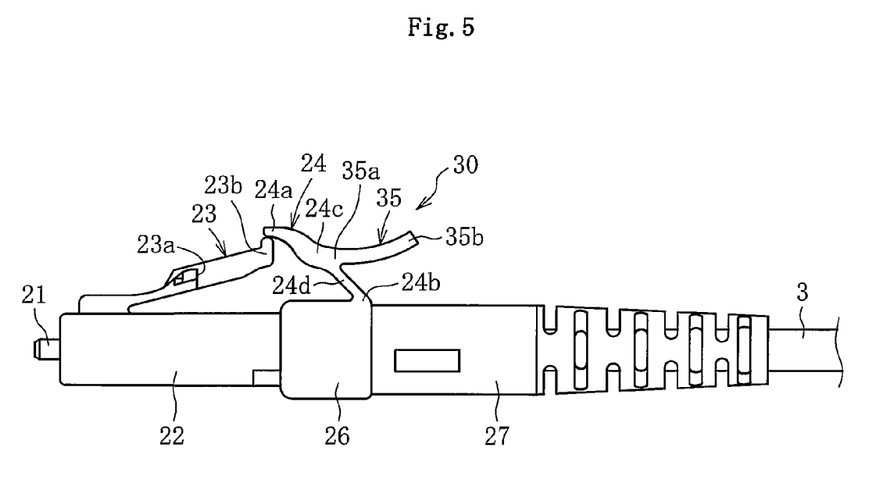
[FIG. 5] A side view of an optical connector according to another embodiment of the present invention.
Figure 6:
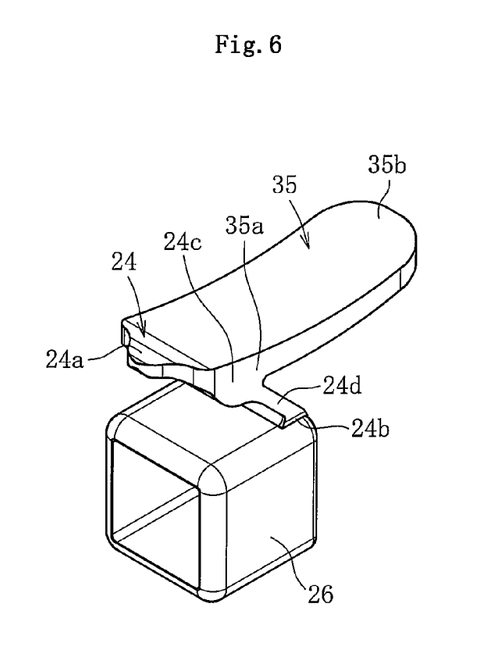
[FIG. 6] A perspective view of an operation lever unit of the optical connector of FIG. 5.

In the above-mentioned embodiment, the second operation lever 25 is formed into a flat-plate-like shape, but the present invention is not limited thereto. For example, a second operation lever 35 of an optical connector 30 illustrated in FIG. 5 and FIG. 6 is curved so that its extending-direction middle portion slightly swells downward. Specifically, a front end portion 35a of the second operation lever 35 is slightly directed forward and obliquely upward. With this structure, in comparison with the embodiment illustrated in FIG. 1, a connecting region between the first operation lever 24 and the second operation lever 35 is widened, and hence strength with respect to the moment load can be increased. Further, a rear end portion 35b of the second operation lever 35 is slightly directed rearward and obliquely upward. With this structure, a finger, a jig, or the like is easily inserted between the second operation lever 35 and the boot 27, which further facilitates detaching work for the optical connector.

Figure 7:
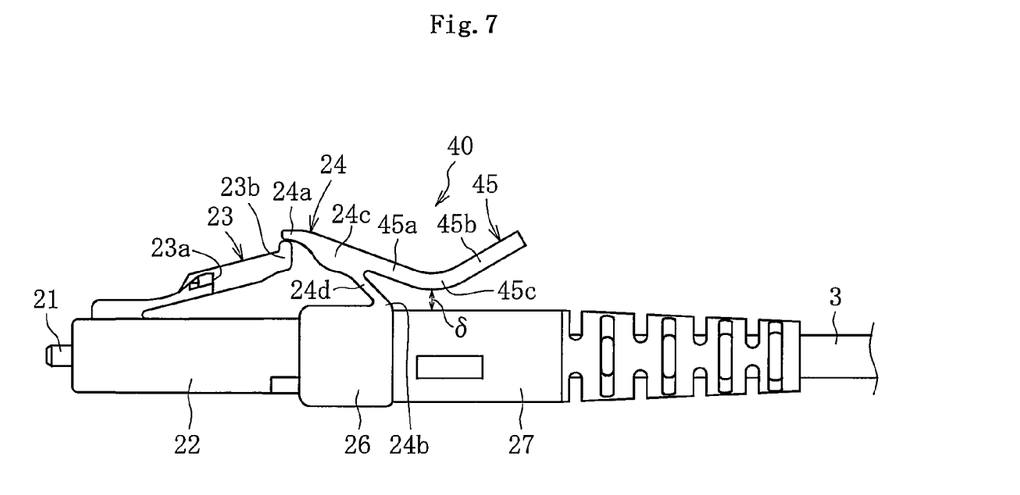
[FIG. 7] A side view of an optical connector according to still another embodiment of the present invention.
Figure 8:
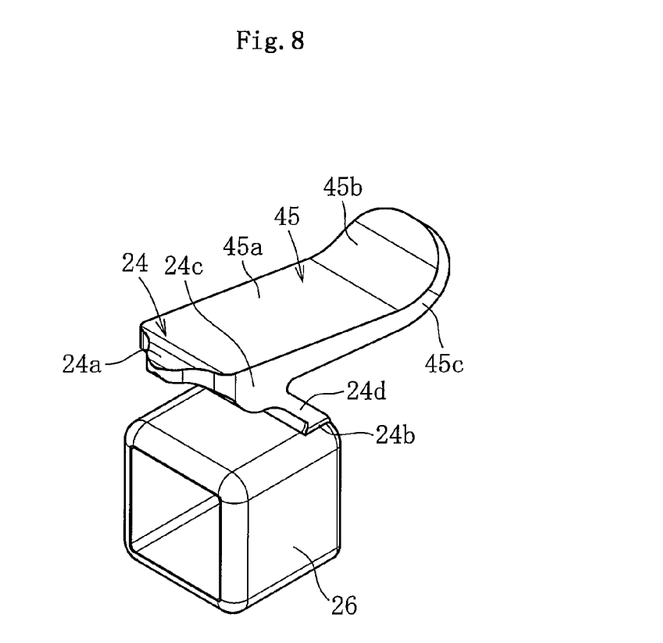
[FIG. 8] A perspective view of an operation lever unit of the optical connector of FIG. 7.

A second operation lever 45 of an optical connector 40 illustrated in FIG. 7 and FIG. 8 is formed into a substantially V-shape and bent at its extending-direction middle portion. An inclination angle of a front portion 45a of the second operation lever 45 with respect to the optical axis direction is larger than that of the embodiment illustrated in FIG. 5 and FIG. 6, and is more approximate to the angle of the first operation lever 24. With this structure, the connecting region between the first operation lever 24 and the second operation lever 45 is further widened, and the strength is further increased. Further, a gap 6 between a bent portion 45c of the second operation lever 45 and the boot 27 is small, and a rear portion 45b of the second operation lever 45 is inclined rearward and obliquely upward. Thus, only by sliding a finger, a jig, or the like in between the bent portion 45c of the second operation lever 45 and the boot 27, the second operation lever 45 can be easily pressed up.

Figure 9:
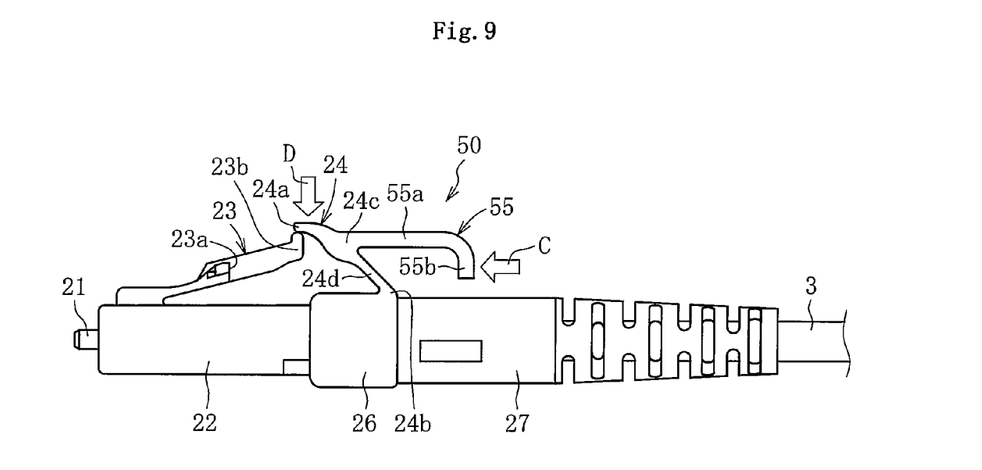
[FIG. 9] A side view of an optical connector according to yet still another embodiment of the present invention.
Figure 10:
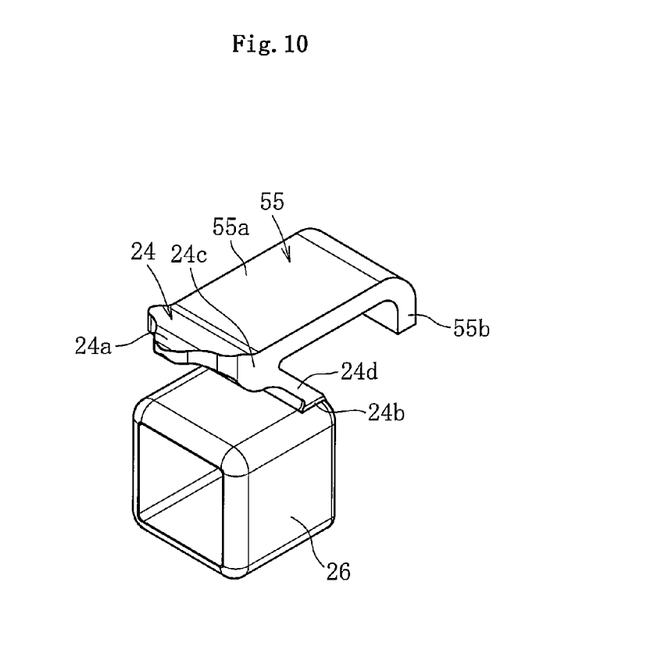
[FIG. 10] A perspective view of an operation lever unit of the optical connector of FIG. 9.

In the above-mentioned embodiments, description is made of the case of inclining the first operation lever 24 forward by pressing the second operation lever 25, 35, or 45 up, to thereby press the locking lever 23 down, but the present invention is not limited thereto. For example, the second operation lever may be pressed forward, to thereby incline the first operation lever 24 forward. An optical connector 50 illustrated in FIG. 9 and FIG. 10 includes a second operation lever 55 that is easy to press forward. Specifically, the second operation lever 55 includes a horizontal portion 55a extending rearward from the first operation lever 24 and having a flat-plate-like shape, and a vertical portion 55b extending downward from the rear end portion of the horizontal portion 55a. By pressing the vertical portion 55b of the second operation lever 55 forward (see an arrow C of FIG. 9), the first operation lever 24 is inclined forward, to thereby press the locking lever 23 down (see an arrow D of FIG. 9). As described above, owing to provision of the flat-plate-shaped vertical portion 55b perpendicular to the optical axis direction at the rear end portion of the second operation lever 55, an area for bringing a finger, a jig, or the like into contact with the second operation lever 55 is ensured, and thus the second operation lever 55 is easily pressed forward.

Figure 11:
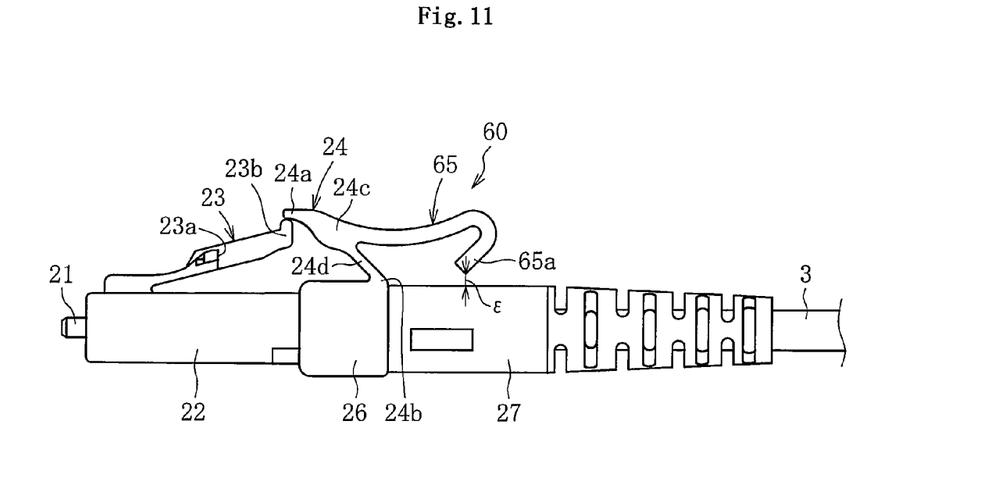
[FIG. 11] A side view of an optical connector according to further still another embodiment of the present invention.
Figure 12:
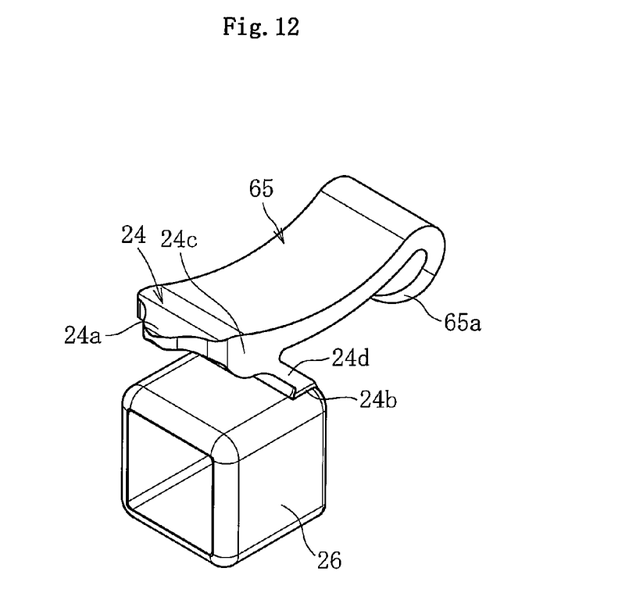
[FIG. 12] A perspective view of an operation lever unit of the optical connector of FIG. 11.

For example, in the optical connector 20 according to the embodiment illustrated in FIG. 1, when the optical fiber cable crawls under the second operation lever 25 and the optical fiber cable moves in the up-down direction, there is a fear in that the second operation lever 25 is accidentally pressed up, to thereby detach the optical connector 20 from the optical adapter. In order to prevent such a situation, it is preferred that the gap between the rear end portion 25a of the second operation lever 25 and the boot 27 be as small as possible. Meanwhile, in light of operativity at the time of pressing the second operation lever 25 up, it is necessary to ensure a predetermined gap between the rear end portion 25a of the second operation lever 25 and the boot 27. Thus, a second operation lever 65 of an optical connector 60 illustrated in FIG. 11 and FIG. 12 includes a folded portion 65a formed by bending a rear end portion of the second operation lever 65 downward. With this structure, a gap $\epsilon$ between the rear end portion (folded portion 65a) of the second operation lever 65 and the boot 27 can be made small, and hence it is possible to prevent such a situation that the optical fiber cable crawls under the second operation lever 65. Further, the folded portion 65a extends forward and obliquely downward, and hence it is possible to easily press the second operation lever 65 up by sliding a finger, a jig, or the like in between the folded portion 65a and the boot 27.

Figure 13:
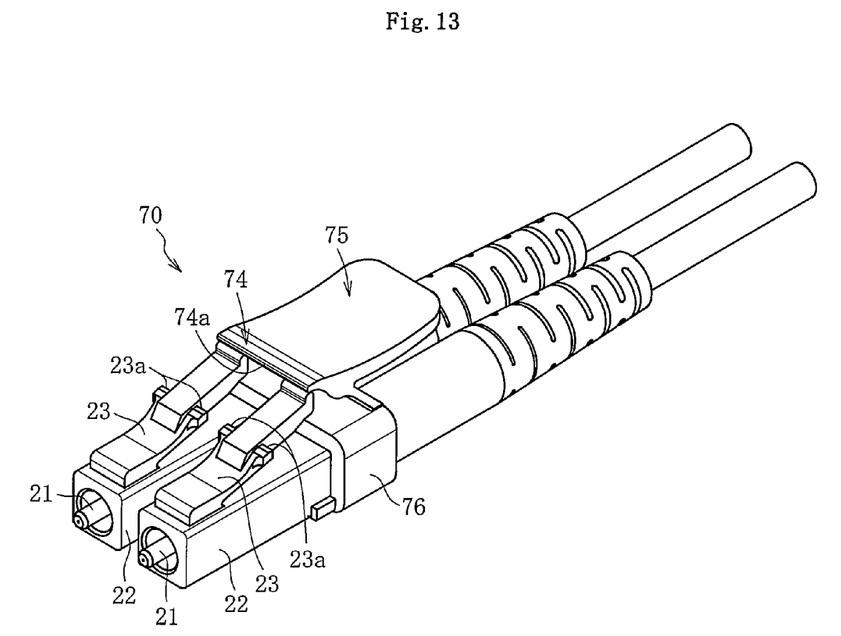
[FIG. 13] A side view of an optical connector according to further still another embodiment of the present invention.

Further, the present invention is also applicable to a duplex optical connector 70 integrally including a pair of ferrules 21 and a pair of housings 22 as illustrated in FIG. 13. The optical connector 70 includes a fixing portion 76 integrating the pair of ferrules 21 and the pair of housings 22, a first operation lever 74 extending from the fixing portion 76, and a second operation lever 75 extending rearward from the first operation lever 74. The first operation lever 74 is provided over a pair of locking levers 23 that are provided on the pair of housings 22, respectively. When the second operation lever 75 is pressed up to incline the first operation lever 74 forward, the pair of locking levers 23 are pressed down altogether.

Further, in the above-mentioned embodiments, as illustrated in FIG. 3, the bottom portion 24d of the first operation lever 24 has the substantially uniform thickness D1, and the second operation lever 25 has the substantially uniform thickness D2. However, the present invention is not limited thereto, and any one of or both of the thicknesses may vary depending on positions. For example, of the second operation lever 25, only the front end portion to which the maximum stress (moment load) is applied can be formed to be thicker than the other regions. In this case, it is preferred that at least the front end portion of the second operation lever 25 be made larger in thickness than the bottom portion 24d of the first operation lever 24.

Further, in the above-mentioned embodiments, as illustrated in, for example, FIG. 2, a width-direction dimension of the bottom portion 24d of the first operation lever 24 and a width-direction dimension of the second operation lever 25 are substantially the same. However, the rigidity of the levers may be adjusted by varying the width-direction dimensions thereof.

Further, in the above-mentioned embodiments, the first operation lever and the second operation lever are integrally provided, but the second operation lever may be provided separately from the first operation lever. However, as described above, integral molding of the levers is preferred because it can increase strength of the connecting portion to which the moment load is applied.

Further, in the above-mentioned embodiments, description is made of the case where the holding member is the housing 22 and the rear end portion 24b of the first operation lever 24 is connected to the top surface of the housing 22 through the fixing portion 26, but the present invention is not limited thereto. For example, the holding member may be constituted by the housing and a cap (not shown) provided on a rear opening portion of the housing, and the first operation lever 24 may be connected to the cap. Alternatively, the holding member may be constituted by the housing and the boot, and the first operation lever 24 may be connected to the boot.

Reference Signs List
1 optical connector
11 ferrule
12 housing
13 locking lever
13a interlocking portion
14 operation lever
2 optical adapter
3 optical fiber cable
20, 30, 40, 50, 60, 70 optical connector
21 ferrule
22 housing
23 locking lever
23a interlocking portion
24, 74 first operation lever
24a front end portion
24b rear end portion
24c connecting portion
24d bottom portion
25, 35, 45, 55, 65, 75 second operation lever
26, 76 fixing portion
27 boot
100 optical server appliance

The invention claimed is:

1. An optical connector, comprising:
   a ferrule to be fixed to a leading end of an optical fiber;
   a holding member for holding the ferrule and the optical fiber within an inner periphery of the holding member;
   a locking lever including an interlocking portion to be engaged with an optical adapter, the locking lever having a front end portion connected onto one side surface of the holding member, and a rear end portion away from the one side surface;
   a first operation lever provided rearward of the locking lever, the first operation lever having a rear end portion connected onto the one side surface, and a front end portion away from the one side surface; and
   a second operation lever extending rearward from the first operation lever, the second operation lever having a rear end portion that is always rearward of the rear end portion of the first operation lever,
   wherein the rear end portion of the locking lever is arranged between the front end portion of the first operation lever and the one side surface, and
   wherein, when the rear end portion of the second operation lever is moved away from the one side surface or the second operation lever is moved towards the locking lever, the front end portion of the first operation lever presses the rear end portion of the locking lever towards the one side surface and is able to disengage the locking lever from the optical adapter.

2. An optical connector according to claim 1, wherein a bottom portion of the first operation lever is smaller in thickness than the second operation lever.

3. An optical connector according to claim 1, wherein the second operation lever is connected on a leading end side with respect to an extending-direction center portion of the first operation lever.

4. An optical connector according to claim 1, wherein the first operation lever and the second operation lever are integrally molded.

* * * * *